No. 733,372. PATENTED JULY 14, 1903.
F. A. COLWELL.
SAFETY NIPPLE.
APPLICATION FILED APR. 28, 1903.
NO MODEL.
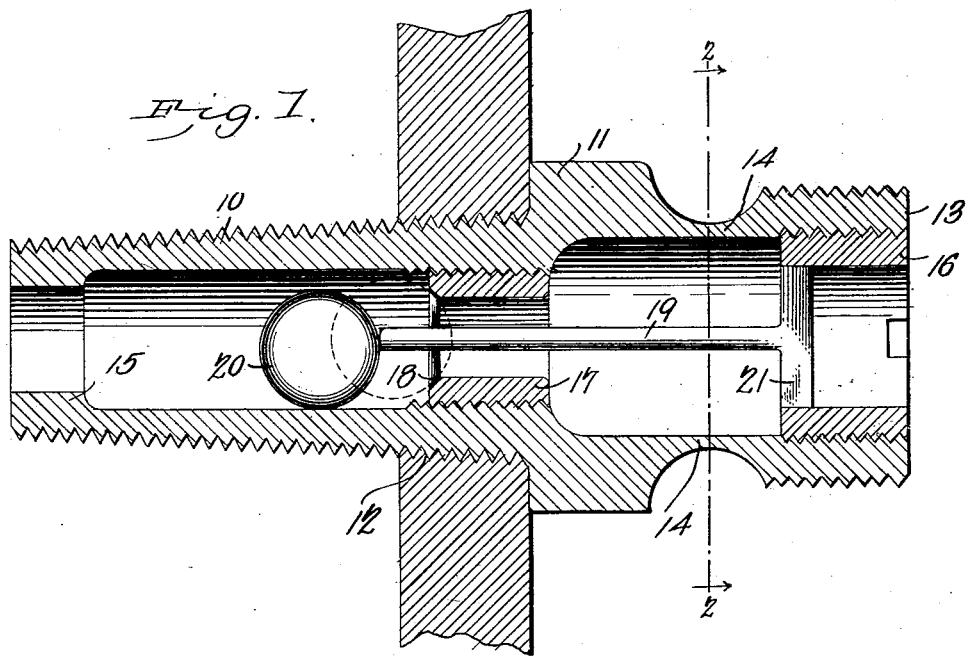
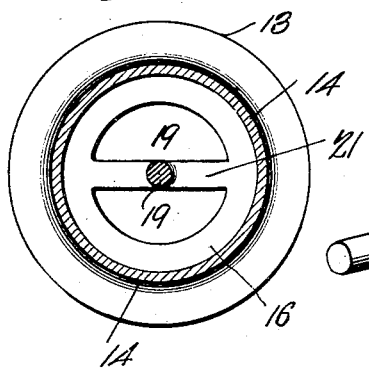
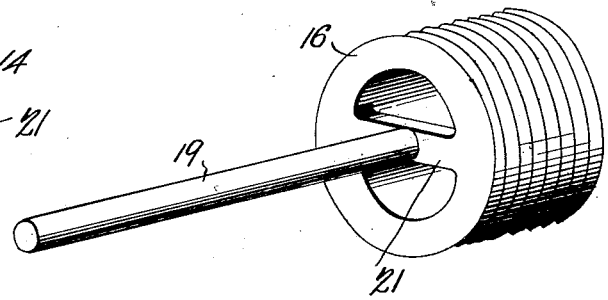
Witnesses
F. A. Colwell, Inventor.
by C. A. Snow & Co
Attorneys No. 733,372.

Patented July 14, 1903.

UNITED STATES PATENT OFFICE.

FRANK A. COLWELL, OF OAKESDALE, WASHINGTON.

SAFETY-NIPPLE.

SPECIFICATION forming part of Letters Patent No. 733,372, dated July 14, 1903.

Application filed April 28, 1903. Serial No. 154,722. (No model.)

*To all whom it may concern:*

Be it known that I, FRANK A. COLWELL, a citizen of the United States, residing at Oakesdale, in the county of Whitman and State of Washington, have invented a new and useful Safety-Nipple, of which the following is a specification.

This device relates to improvements in safety-nipples for steam-generators and similar structures and to structures in general containing steam or other fluids under pressure or otherwise whose accidental escape it is desired to prevent; and it has for its object to provide a means whereby in event of the rupture of any of the various attachments to such devices the outflow will be instantly shut off and all danger therefrom obviated or loss prevented.

The invention consists in certain novel features of construction, as hereinafter shown and described, and specified in the claims.

In the drawings illustrative of the invention, in which corresponding parts are denoted by like designating characters, Figure 1 is a longitudinal sectional view. Fig. 2 is a transverse section on the line 2 2 of Fig. 1. Fig. 3 is a perspective view of the valve-stop device detached.

The improved device may be employed in connection with any apparatus containing steam or other fluids whose escape it is desired to prevent in case of an accident, and I do not, therefore, wish to be limited to the use of the device in connection with any specific form of apparatus or to apparatus employed for any specific purpose and reserve the right to its use in all localities and for all purposes for which it is adapted.

The invention is more particularly applicable to steam-generators and similar structures containing steam or other gases under pressure and from which test-gages, pressure-indicators, and like devices are conducted by pipes connected through the shell of the generators, and for the purpose of illustration the device is shown thus applied and consists of a threaded plug 10, preferably slightly tapered and having a combined stop-collar and wrench-head 11, the plug adapted to engage a threaded aperture in the generator-shell, (indicated at 12,) with the collar 11 abutting against the outer surface of the shell, as shown in Fig. 1. Means will be provided for "packing" the plug, if necessary, to render the joint gas or steam tight. The plug 10 is extended outside of the collar 12, as at 13, and exteriorly threaded to provide for coupling the steam-gages, test devices, or other attachments, the latter not being shown, as they form no part of the present invention. Between the extended coupling end 13 and the collar 12 a weakening-channel 14 is formed around the plug, as shown, to provide for the rupture of the plug at a predetermined point. The plug 10 13 is hollow throughout its length and the inner end thereof reduced on its interior to form an annular shoulder or stop 15 for the valve, and it is provided with a bushing 16 in the outer end and with an intermediate bushing 17, as shown. The bushings are externally threaded and fit correspondingly internally threaded portions in the plug, the bushing 17 having an inwardly-facing valve-seat 18 and the bushing 16 having a stem 19 extending therefrom through the bushing 17 and serving as a stop to maintain a valve 20 unseated. The stem 19 is connected to the bushing 16 by a transverse bar 21, so that apertures will be left for the free passage of the steam or other fluid. By this simple means so long as the attachments remain intact the flow of the steam or other medium will not be interrupted and the valve 20 will remain inoperative. If, however, the attachment is subjected to a breaking strain from any cause, the walls of the weakened channel 14 will yield first, and the rupture at this point will cause the stem 19, which will be suddenly withdrawn from engagement with the valve 20, to be instantly seated by the pressure of the fluid and effectually shut off the escape of the steam or other medium.

The collar 11 rigidly supports the plug in position and materially assists the threaded portion 10 to resist any lateral strains to which it may be subjected in event of rupture at the channel 14, so that no matter how severe the rupturing blow may be the position of the portion of the plug connected through the shell will not be disturbed. This is an important feature of the invention and adds materially to the value and efficiency of the device.

The plugs may be of any desired size and adapted to be connected to any of the various attachments employed with generators and the like and will preferably be of non-corrosive metal, such as brass or similar material.

Having thus described the invention, what I claim is—

1. A safety device for steam-boilers and the like consisting of a plug adapted for insertion through the boiler-shell and having a weakening-channel exteriorly of the boiler, a bushing within said plug between its inner end and said channel and having an inwardly-facing valve-seat, a valve adapted for seating upon said valve-seat, a bushing within said plug between its outer end and said channel and carrying a stem adapted to normally maintain said valve unseated.

2. A safety-nipple consisting of a plug adapted for insertion through the boiler-shell and having a weakened portion disposed exteriorly of the boiler, a valve-seat formed within said plug in the portion thereof disposed within the boiler, a valve adapted for seating thereupon, a bushing within said plug between its outer end and said weakened portion and carrying a stem adapted to engage and maintain said valve normally unseated.

In testimony that I claim the foregoing as my own I have hereto affixed my signature in the presence of two witnesses.

FRANK A. COLWELL.

Witnesses:
R. J. NEESGAARD,
DANL. MORGAN.